US009359967B2

(12) United States Patent
Santillo et al.

(10) Patent No.: US 9,359,967 B2
(45) Date of Patent: Jun. 7, 2016

(54) METHOD FOR IDENTIFICATION OF A THRESHOLD-LEVEL CATALYST

(71) Applicant: Ford Global Technologies, LLC, Dearborn, MI (US)

(72) Inventors: Mario Anthony Santillo, Canton, MI (US); Steve William Magner, Farmington Hills, MI (US); Michael James Uhrich, West Bloomfield, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 14/476,538

(22) Filed: Sep. 3, 2014

(65) Prior Publication Data

US 2016/0061131 A1 Mar. 3, 2016

(51) Int. Cl.

| *F01N 3/00* | (2006.01) |
|---|---|
| *F02D 41/02* | (2006.01) |
| *F01N 3/20* | (2006.01) |
| *F01N 11/00* | (2006.01) |

(52) U.S. Cl.
CPC .............. *F02D 41/0295* (2013.01); *F01N 3/20* (2013.01); *F01N 11/007* (2013.01)

(58) Field of Classification Search
CPC ... F01N 2250/02; F01N 11/007; F01N 11/00; F01N 3/0842; F01N 13/02; F02D 41/1441; F02D 41/0275; F02D 41/0295
USPC ........... 60/295, 285, 286, 287, 289, 301, 274; 73/114.69, 114.71, 114.72, 114.73, 73/114.75
See application file for complete search history.

(56) References Cited

U.S. PATENT DOCUMENTS

| 5,077,970 | A | * | 1/1992 | Hamburg | ............... | F01N 11/007 60/274 |
|---|---|---|---|---|---|---|
| 5,099,647 | A | * | 3/1992 | Hamburg | ............... | F01N 11/007 123/691 |
| 5,157,919 | A | * | 10/1992 | Gopp | ..................... | F01N 11/007 60/274 |
| 5,272,872 | A | * | 12/1993 | Grutter | ................. | F01N 11/007 60/274 |
| 5,289,678 | A | * | 3/1994 | Grutter | ................. | F01N 11/007 60/274 |
| 5,365,216 | A | * | 11/1994 | Kotwicki | ............... | F01N 11/007 123/198 D |
| 5,381,656 | A | * | 1/1995 | Orzel | .................... | F01N 11/007 123/674 |
| 5,404,718 | A | * | 4/1995 | Orzel | .................... | F01N 11/007 123/674 |
| 6,073,073 | A | * | 6/2000 | Kitamura | ............ | F02D 41/1402 123/698 |
| 6,401,453 | B1 | | 6/2002 | Lemire | | |
| 6,502,386 | B1 | | 1/2003 | Mazur et al. | | |
| 6,532,734 | B1 | | 3/2003 | Nader et al. | | |
| 6,564,543 | B1 | * | 5/2003 | Orzel | .................... | F01N 11/007 60/274 |

(Continued)

OTHER PUBLICATIONS

Santillo, Mario A. et al., "Identification and Rejection of Asymmetric Faults," U.S. Appl. No. 14/299,955, filed Jun. 9, 2014, 35 pages.

(Continued)

*Primary Examiner* — Patrick Maines
(74) *Attorney, Agent, or Firm* — Julia Voutyras; Alleman Hall McCoy Russell & Tuttle LLP

(57) ABSTRACT

Systems and methods for estimating catalyst transfer function gain are disclosed. In one example, an air-fuel ratio forcing function is applied to a catalyst. Air-fuel ratios upstream and downstream of the catalyst are manipulated to determine a transfer function gain of the catalyst. The transfer function gain may be a basis for indicating the presence or absence of catalyst degradation.

10 Claims, 7 Drawing Sheets

(56) References Cited

U.S. PATENT DOCUMENTS

| | | |
|---|---|---|
| 6,981,368 B2 | 1/2006 | van Nieuwstadt et al. |
| 7,603,845 B2 | 10/2009 | Dionnet et al. |
| 8,726,723 B2 | 5/2014 | Clerc et al. |
| 8,800,356 B2 | 8/2014 | Makki et al. |
| 2007/0256406 A1* | 11/2007 | Makki ............ F01N 11/007 60/277 |
| 2011/0083425 A1 | 4/2011 | Sealy et al. |
| 2013/0008149 A1 | 1/2013 | Ukropec et al. |
| 2013/0231846 A1* | 9/2013 | Magner ............ F02D 41/1441 701/108 |
| 2013/0245919 A1 | 9/2013 | Kumar et al. |
| 2014/0283589 A1 | 9/2014 | Makki et al. |

OTHER PUBLICATIONS

Uhrich, Michael J. et al., "A Dual HEGO Method for Identification and Mitigation of Air-Fuel Imbalance Faults," U.S. Appl. No. 14/334,375, filed Jul. 17, 2014, 46 pages.

* cited by examiner

METHOD FOR IDENTIFICATION OF A THRESHOLD-LEVEL CATALYST

BACKGROUND AND SUMMARY

A vehicle may include a three-way catalyst (TWC) for treating exhaust gases of an internal combustion engine. Feedback control may be applied to regulate an engine's air-fuel ratio so that engine exhaust constituents may be adjusted in a way that improves catalyst efficiency. Some vehicles may include a universal exhaust gas oxygen (UEGO) sensor positioned upstream of the TWC and a heated exhaust gas oxygen (HEGO) sensor positioned downstream of the TWC to control the AFR near stoichiometry. The UEGO sensor provides feedback to adjust engine out gases about stoichiometry. The HEGO sensor provides feedback to bias the engine air-fuel ratio richer or leaner to improve catalyst efficiency.

Precise engine air-fuel ratio control may improve catalyst conversion efficiency; however, if the catalyst is in a degraded state, vehicle emissions may be above regulated levels even if the engine air-fuel ratio is precisely controlled. Therefore, it may be desirable to determine whether or not a catalyst is degraded so that remedial measures may be taken to bring the vehicle back within a regulated emissions level or to alert the driver to take the vehicle to a dealership for repair.

One way to judge whether or not a catalyst is degraded is to make a one-time change to the engine's air fuel ratio from lean to rich or vise-versa and measure the time it takes to observe a corresponding change in exhaust gas oxygen concentration downstream of a catalyst. The time it takes to observe a change in oxygen concentration may provide an indication as to a level of catalyst degradation. However, engine exhaust emissions may be degraded if rich or lean exhaust gases break through the catalyst due to intrusive changes in the engine's air-fuel ratio. Further, opportunities to monitor a step change may be limited and noise in the system may make the estimated results based on only a few observations less certain.

The inventors have recognized the above-mentioned disadvantages and have developed a method, comprising: during feedback engine air-fuel ratio control responsive to a downstream of a catalyst exhaust gas sensor: indicating degradation of the catalyst in response to a catalyst transfer function determined only within a specified frequency range based on the exhaust gas sensor output.

By determining a catalyst's transfer function only within a specified frequency range, it may be possible to provide the technical result of assessing catalyst degradation via engine air-fuel ratio modulation used to improve catalyst efficiency. In other words, a catalyst degradation assessment may be provided based on small air-fuel ratio variations routinely used to improve catalyst efficiency rather that via a specialized perturbation that may result in emission breakthrough. As a result, an assessment of catalyst degradation may be possible in a way that does not degrade vehicle emissions and may be more robust to many sources of noise.

The present description may provide several advantages. In particular, the approach may improve vehicle catalyst diagnostics. Additionally, the approach may provide improved vehicle emissions by providing an indication of a condition of catalyst degradation. Further, the approach may provide a catalyst diagnostic that is not intrusive or noticeable by a driver.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

Figure 6:
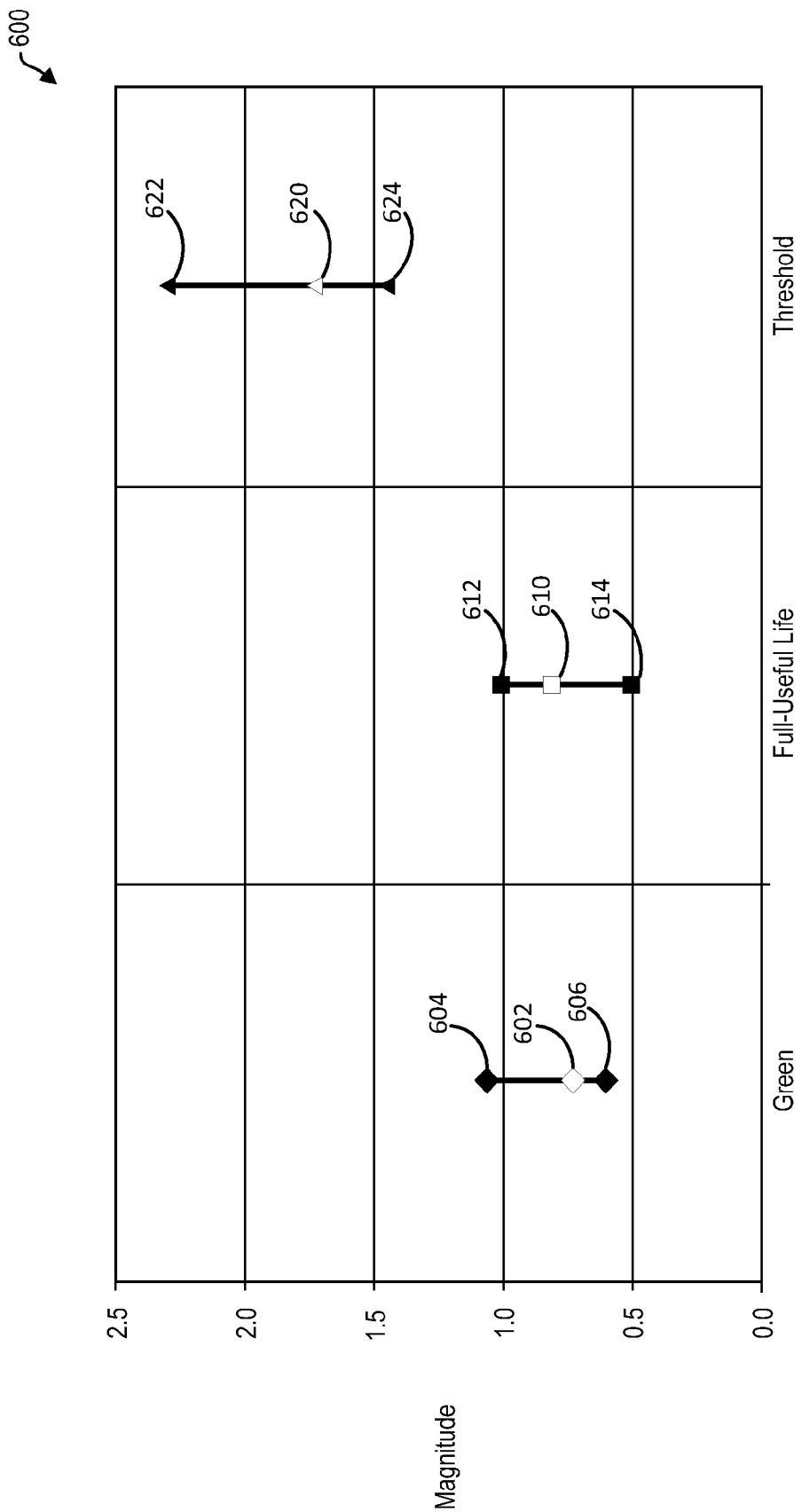
Figure 7:
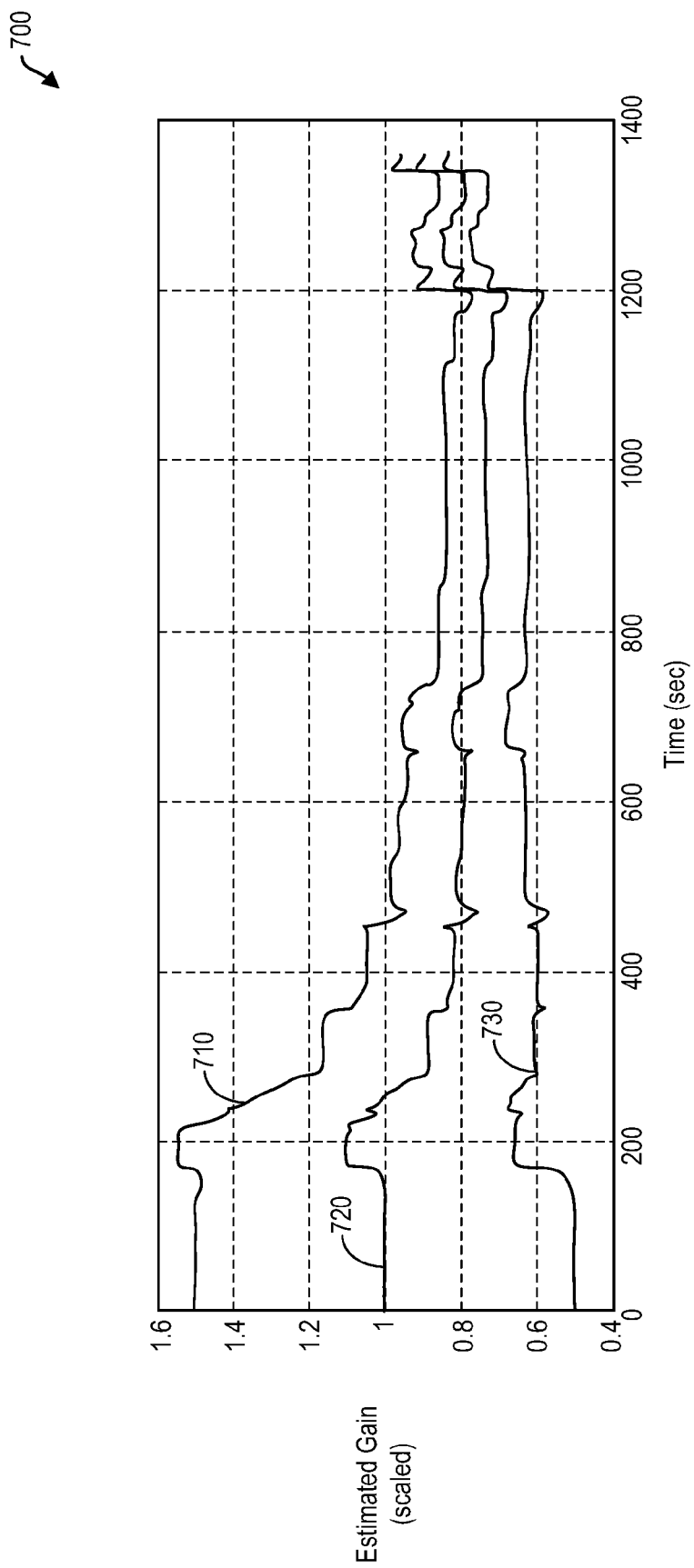

FIG. 6 shows an example plot of adapted catalyst transfer function gains for green (e.g., new), full-useful life (e.g., aged catalysts that perform as desired to a hypothetical vehicle life span), and threshold (e.g., catalysts that meet minimum emissions thresholds) catalysts; and FIG. 7 shows an example plot of catalyst transfer function adaptation of gains that begin at different initial conditions.

DETAILED DESCRIPTION

The present description is related to diagnosing the presence or absence of catalyst degradation. Specifically, methods and systems for determining a catalyst transfer function and its gain are described. The systems and methods may be implemented in a vehicle that includes an engine such as the engine system depicted in FIG. 1. The engine system may include an air-fuel control system as is shown in FIG. 2. A method for determining a catalyst transfer function gain is provided in FIG. 3. Example performance results for the method and system are shown in FIGS. 4-7.

Figure 1:
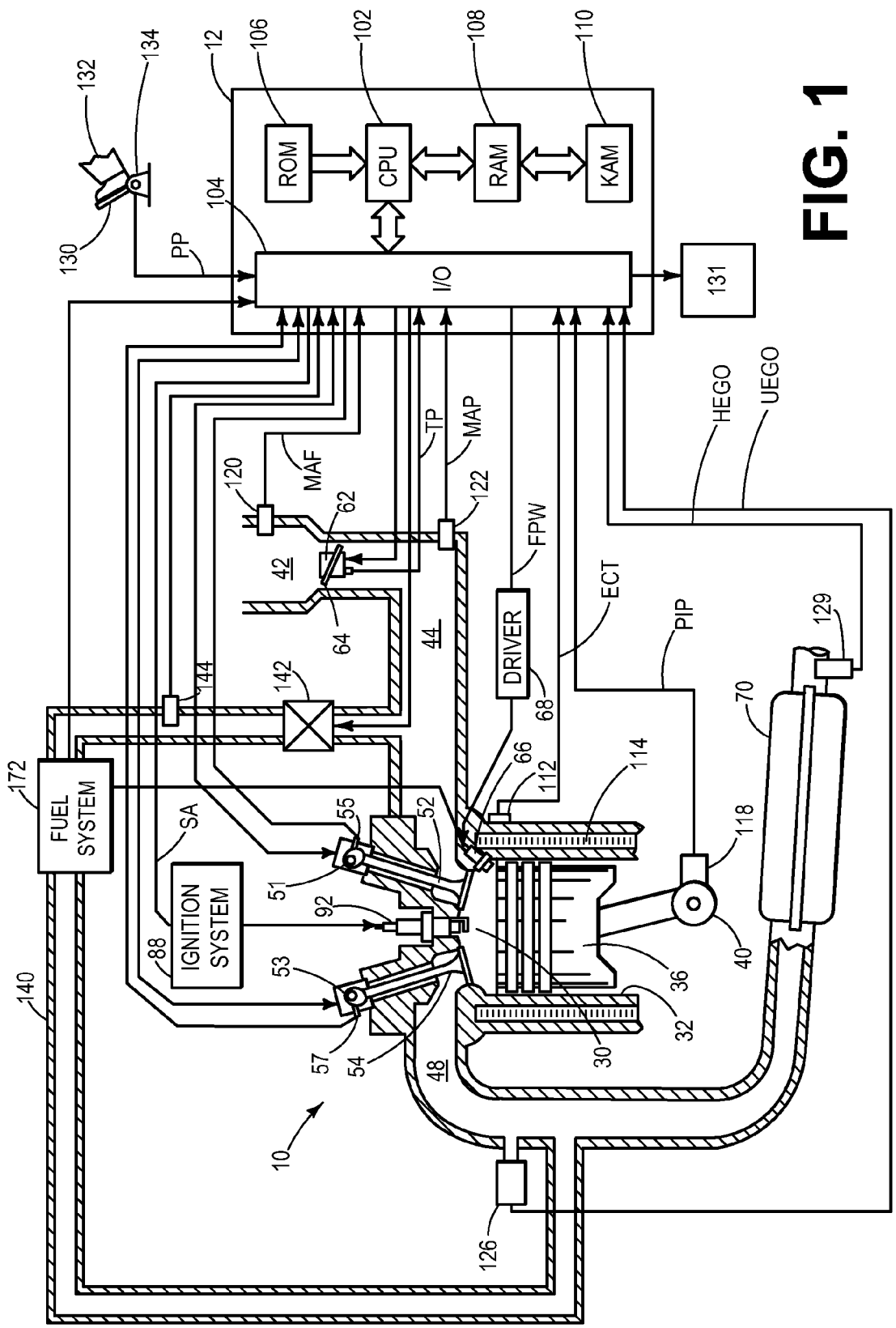
FIG. 1 shows a schematic depiction of an example engine system.
Figure 2:
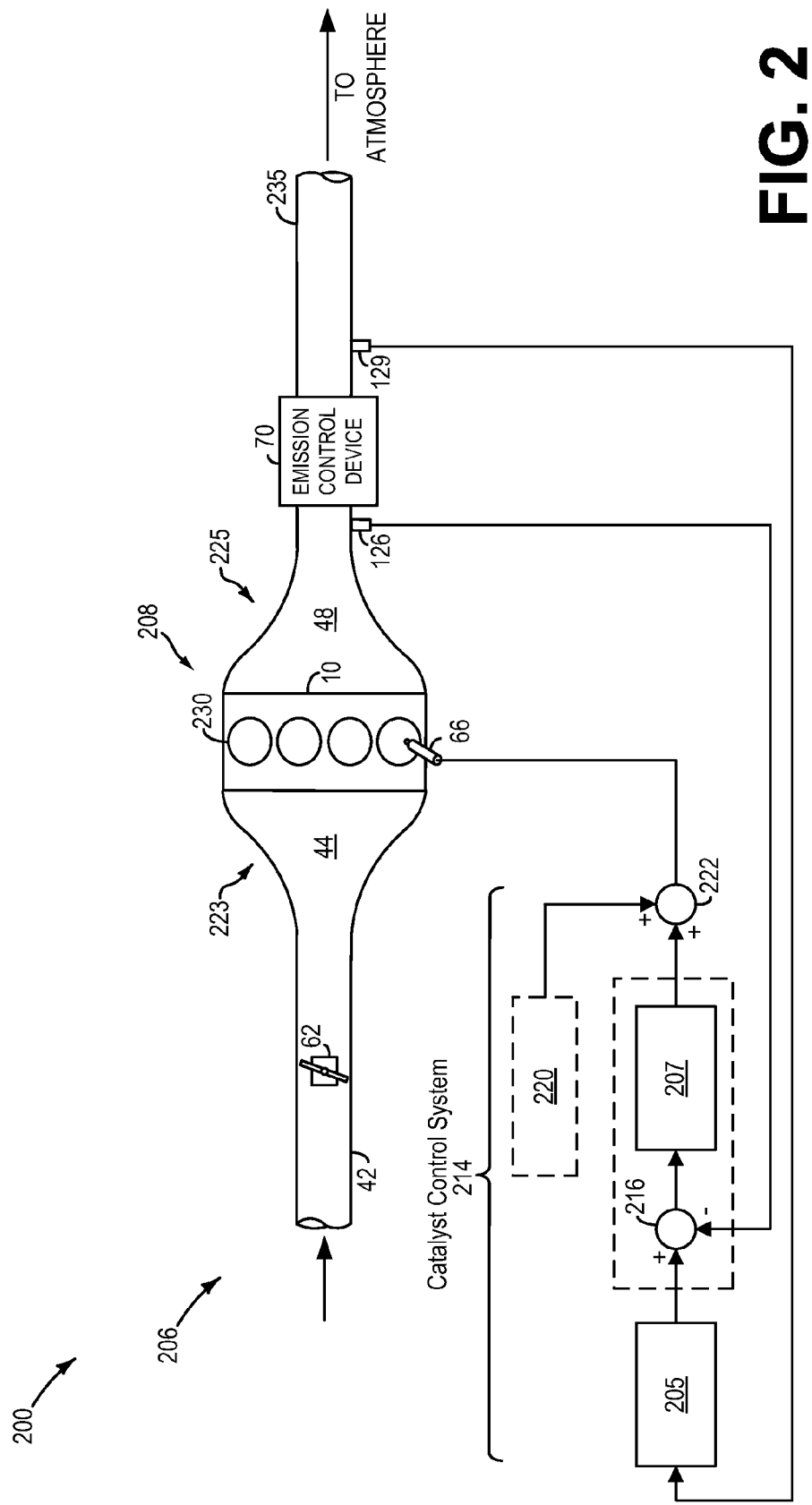
FIG. 2 shows a schematic illustration of an example catalyst control system.

FIG. 1 illustrates a schematic diagram showing one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 is an accelerator pedal and it includes a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may engage crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some examples, combustion chamber 30 may include two or more intake valves and/or two or more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative examples, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some examples, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate example, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some examples, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas air-fuel ratio such as a linear wideband oxygen sensor or UEGO (universal or wide-range exhaust gas oxygen), a two-state narrowband oxygen sensor or EGO, a HEGO (heated EGO), a NOx, HC, or CO sensor. In one example, upstream exhaust gas sensor 126 is a UEGO configured to provide output, such as a voltage signal, that is proportional to the amount of oxygen present in the exhaust. Controller 12 uses the output to determine the exhaust gas air-fuel ratio.

Emission control device 70 is shown arranged along exhaust passage 48 downstream of exhaust gas sensor 126. Device 70 may be a three-way catalyst (TWC), configured to reduce NOx and oxidize CO and unburnt hydrocarbons. In some examples, device 70 may be a NOx trap, various other emission control devices, or combinations thereof.

A second, downstream exhaust gas sensor 129 is shown coupled to exhaust passage 48 downstream of emissions control device 70. Downstream sensor 129 may be any suitable sensor for providing an indication of exhaust gas air-fuel ratio such as a UEGO, EGO, HEGO, etc. In one example, downstream sensor 129 is a HEGO configured to indicate the relative enrichment or leanness of the exhaust gas after passing through the catalyst. As such, the HEGO may provide output in the form of a switch point, or the voltage signal at the point at which the exhaust gas switches from lean to rich.

Further, in the disclosed examples, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure (MAP) signal from sensor 122. Engine speed, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

In some examples, controller 12 may output an indication of system degradation to a light or display panel 131. The indication may be a visual alert such as an illuminated light or a message. The message may include a diagnostic code that indicates the nature of the degraded condition. For example, controller 12 may indicate a degraded catalyst via light or display panel 131. The indication may be an alpha-numeric code representing catalyst or other component degradation.

As described above, FIG. 1 shows only one cylinder of a multi-cylinder engine, and each cylinder may similarly include its own set of intake/exhaust valves, fuel injector, spark plug, etc.

FIG. 2 shows a schematic illustration of inner and outer feedback control loops for a catalyst control architecture 200. Catalyst control architecture 200 includes an engine system 206 and a catalyst control system 214, where the engine 10 includes an exhaust system 225.

The engine system 208 may include an engine 10 having a plurality of cylinders 230. The engine 10 includes an engine intake 42 and an engine exhaust 48. The engine intake 42 includes a throttle 62 in fluidic communication with engine intake manifold 44. The engine exhaust system 225 includes an exhaust manifold 48 leading to an exhaust passage 235 that routes exhaust gas to the atmosphere. The engine exhaust system 225 may include one or more emission control devices 70, which may be mounted in a close-coupled position in the exhaust. One or more emission control devices may include a three-way catalyst, lean NOx trap, particulate filter, oxidation catalyst, etc. It will be appreciated that other components may be included in the engine such as a variety of valves and sensors, as depicted, for example, in FIG. 1.

The vehicle system 206 may further include a catalyst control system 214. Catalyst control system 214 is shown receiving information from exhaust gas oxygen sensors 126 and 129 and sending control signals to fuel injectors 66. As one example, exhaust gas oxygen sensors may include exhaust gas sensor 126 located upstream of the emission control device 70, and exhaust gas sensor 129 located downstream of the emission control device 70. Other sensors such as pressure, temperature, air-fuel ratio, and composition sensors may be coupled to various locations in the vehicle system 206. The catalyst control system 214 may receive input data from the various sensors, process the input data, and apply the actuators in response to the processed input data based on instructions or code programmed therein corresponding to one or more routines. Catalyst control system 214 may be configured with instructions stored in non-transitory memory that cause catalyst control system 214 to perform control routines via one or more actuators based on information received via one or more sensors. Example control routines are described herein with reference to FIG. 3.

In one example, emission control device 70 is a three-way catalyst, exhaust gas sensor 126 is a UEGO sensor, and exhaust gas sensor 129 is a HEGO sensor.

Catalyst control system 214 regulates the air-to-fuel ratio (AFR) to a desired air-fuel ratio near stoichiometry and fine-tunes this regulation based on the deviation of a HEGO voltage from a pre-determined HEGO-voltage set point Inner-loop controller 207 uses the upstream UEGO sensor 126 for higher-bandwidth feedback control while outer-loop controller 205 uses the HEGO sensor 129 for lower-bandwidth control. Catalyst control system 214 may be implemented by an engine controller, such as controller 12.

Inner-loop controller 207 may comprise a proportional-integral-derivative (PID) controller that regulates the engine AFR by generating an appropriate fuel command (e.g., fuel pulse width). Summing junction 222 combines the fuel command from inner-loop controller 207 with commands from feed-forward controller 220. This combined set of commands is delivered to the fuel injectors 66 of engine 10. UEGO sensor 126 provides a feedback signal to the inner-loop controller 207, the UEGO feedback signal proportional to the oxygen content of the feedgas or engine exhaust between the engine 10 and TWC 70. Outer-loop controller 205 generates a UEGO reference signal (e.g., a desired air-fuel ratio) provided to the inner-loop controller 207. The UEGO reference signal is combined with the UEGO feedback signal at junction 216. The error or difference signal provided by junction 216 is then used by inner-loop controller 207 to adjust the fuel command so that the actual AFR within engine 10 approaches the desired AFR. HEGO sensor 129 provides feedback to the outer loop controller 205. The HEGO feedback signal may be used to adjust the UEGO reference signal, or air-fuel ratio reference signal, provided to inner-loop controller 207 via junction 216. Additionally, outer loop controller 205 works to improve catalyst efficiency by imposing a low amplitude air-fuel ratio square wave at the catalyst input. The square wave allows exhaust gas constituents entering the catalyst to vary so as to replenish oxygen and CO in the catalyst, thereby improving hydrocarbon oxidation and NOx reduction.

Thus, the system of FIGS. 1 and 2 provides for a system, comprising: an engine including an exhaust system, the exhaust system including a catalyst and oxygen sensors positioned upstream and downstream of the catalyst; and a controller including instructions stored in non-transitory memory for adjusting an actuator in response to a catalyst transfer function gain determined only within a specified frequency range of a predetermined square wave forcing function plus and minus an offset. The system includes where the specified frequency range of the predetermined forcing function is 1.5 Hz. The example system includes where the offset is 1 Hz. Thus, the example pass band may be between 0.5 Hz and 2.5 Hz. The example system further comprises additional instructions to band-pass filter output of the upstream and downstream oxygen sensors. The system further comprises additional instructions to determine an error from a difference between the band-pass filtered output of the upstream and downstream oxygen sensors. The system further comprises supplying an air-fuel ratio varying at a first frequency to estimate a first catalyst transfer function gain.

Figure 3:
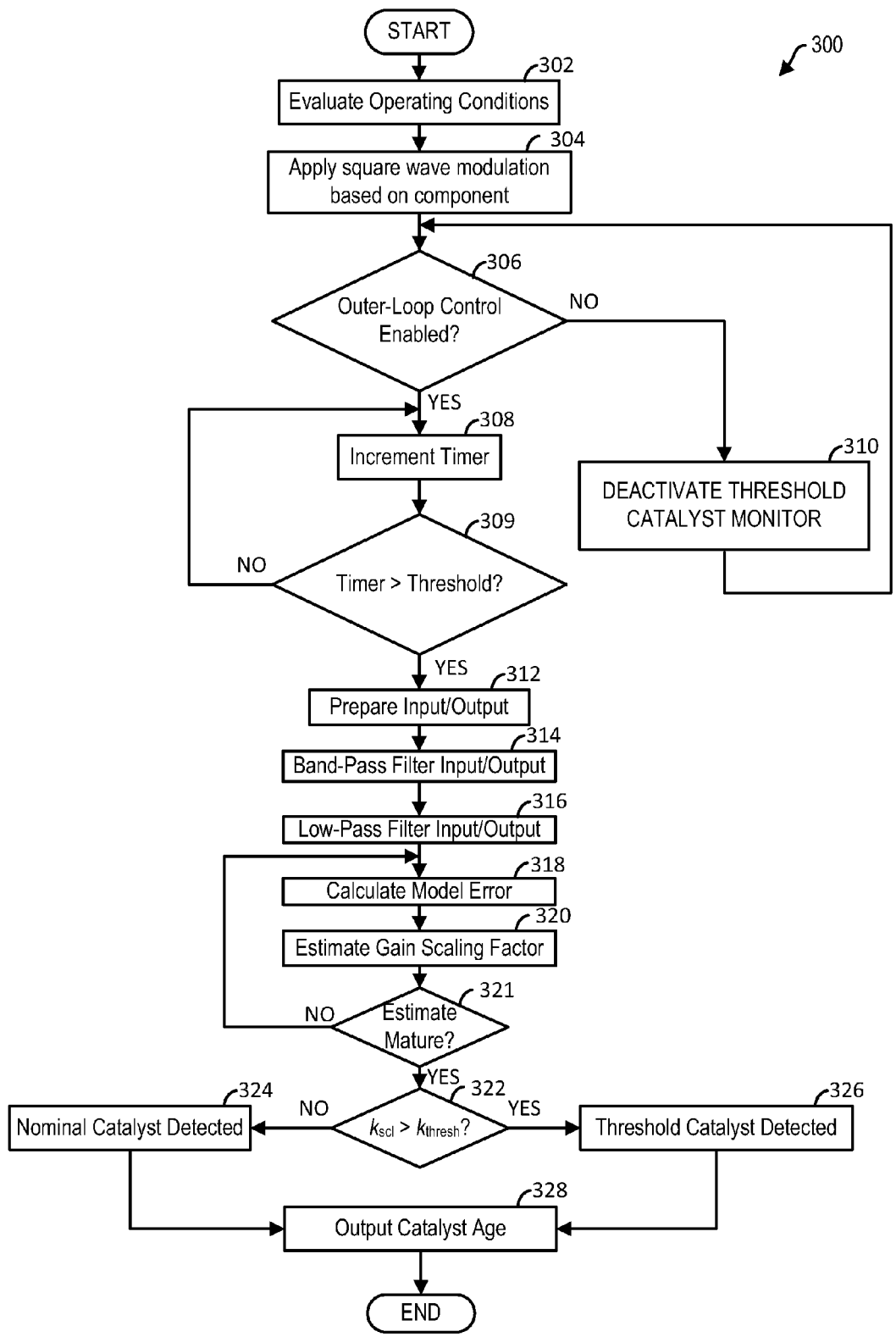
FIG. 3 shows a high-level flow chart illustrating an example method for identifying a threshold catalyst.

FIG. 3 is a high-level flow chart illustrating an example method 300 for identifying a threshold catalyst in accordance with the current disclosure. In particular, method 300 relates to determining the magnitude of a catalyst's frequency-domain transfer function in a specific range of frequencies corresponding to a commanded square-wave input. Method 300 will be described herein with reference to the components and systems depicted in FIGS. 1 and 2, though it should be understood that the method may be applied to other systems without departing from the scope of this disclosure. Method 300 may be carried out by controller 12, and may be stored as executable instructions in non-transitory memory.

At 302, method 300 evaluates engine operating conditions. Operating conditions may include but are not limited to engine temperature, ambient temperature, engine speed, engine load, time since engine stop, engine air-fuel ratio, and HEGO sensor voltage. Method 300 proceeds to 304 after engine operating conditions are determined.

At 304, method 300 applies an air-fuel modulation to the engine air-fuel ratio. The amplitude of the modulation is centered about stoichiometry or a small bias may be applied. The air-fuel modulation frequency may be based on the volume and location of the catalyst for which the transfer function is being estimated or other factors such as engine speed and load. In one example, the frequency may be 1.5 Hz. Method 300 proceeds to 306 after beginning to modulate the engine's air-fuel ratio. In some example systems, step 304 is already active when outer loop control is enabled.

At 306, method 300 judges if the engine's outer air-fuel ratio control loop has been activated. In one example, the outer air-fuel control ratio may be activated after the engine's inner air-fuel ratio control loop has activated and controlling to a desired air-fuel ratio near stoichiometry, after the rear HEGO sensor reaches a threshold temperature, and in response to a threshold amount of time since engine start. In this way, method 300 may avoid determining the magnitude of the catalyst's transfer function if the vehicle is operating in a fuel cut-out mode, cold start, or other condition where post catalyst air-fuel ratio may not be reliable for catalyst transfer function determination. If method 300 judges that the outer air-fuel control loop is active, the answer is yes and method 300 proceeds to 308. Otherwise, the answer is no and method 300 proceeds to 310.

At 310, method 300 deactivates the catalyst monitor. The catalyst monitor is deactivated since the HEGO output may not be reliable under the present conditions. Method 300 returns to 306 after the catalyst monitor is deactivated and will not attempt to run until the next program loop.

At 308, method 300 activates and increments a timer. The timer allows the system to avoid determining the catalyst transfer function magnitude during mode transients after the outer air-fuel ratio control loop is activated. Method 300 proceeds to 309 after the timer is incremented.

At 309, method 300 judges if a value of the timer is greater than a threshold value. If so, the answer is yes and method 300 proceeds to 312. Otherwise, the answer is no and method 300 returns to 308 where the timer is incremented.

At 312, method 300 prepares the monitored catalyst's input and output for processing. In particular, the output voltage of the upstream UEGO is converted into an air-fuel ratio. Likewise, the HEGO sensor output is converted into an air-fuel ratio. The voltage output from the sensors is representative of an oxygen concentration in the exhausts. The voltages are converted into air-fuel ratios via passing the voltages through transfer functions having air-fuel ratio as output.

Additionally, the tail pipe air-fuel ratio as estimated from the HEGO sensor output is operated on by a high pass filter with an adjustable time constant $t_c$ (e.g., a typical safeguard against signal noise introduced near the sampling frequency) to estimate the derivative of the output as shown in the following equation:

$$\dot{y}_f = \frac{s}{t_c s + 1} y$$

where $\dot{y}_f$ is the estimated derivative of the catalyst output gas air-fuel ratio y, s is the Laplace operator, and $t_c$ is an adjustable time constant. The catalyst air-fuel ratio input determined from the UEGO is converted into a modeled output of the subject catalyst. In particular, the UEGO determined air-fuel ratio, the input u, is operated on by a system delay $\tau_d$, a low-pass filter with time constant $t_c$, and a system gain $k_0$ to provide the modeled derivative of the catalyst output gas air-fuel ratio as described in the following equation:

$$\dot{y}_{m,f} = \frac{k_0}{t_c s + 1} u(t - \tau_d)$$

where $\dot{y}_{m,f}$ is the modeled estimated derivative of the catalyst output gas air-fuel ratio y, s is the Laplace operator, and $t_c$ is an adjustable time constant, u is the catalyst input air-fuel ratio, and $\tau_d$ is a time delay. The $k_o$ and $\tau_d$ are representative of a nominal catalyst system and are typically functions of engine variables such as mass flow through the engine system. Method 300 proceeds to 314 after the sensor outputs are converted into air-fuel ratios and filtered as described above.

At 314, method 300 the derivative of the measured downstream or post catalyst air-fuel ratio $\dot{y}_f$ and the derivative of the modeled downstream air-fuel ratio $\dot{y}_{m,f}$ are band-passed filtered. The filtering may be expressed by the following equation:

$$\{\dot{y}_{bp}, \dot{y}_{m,bp}\} = G_{bp}(s)\{\dot{y}_f, \dot{y}_{m,f}, t_{cb}, t_{ch}\}$$

where $G_{bp}$ designates the transfer function of the band-pass filter, $\dot{y}_{bp}$ is the band-pass filtered version of $\dot{y}_f$, $\dot{y}_{m,bp}$ is the band-passed filtered version of $\dot{y}_{m,f}$, and $t_{cl}$ and $t_{ch}$ are low and high cut off frequencies of the band pass filter. Method 300 proceeds to 316 after the signals have been band-pass filtered.

At 316, method 300 applies a low-pass or moving average filter to $\dot{y}_{bp}$ and $\dot{y}_{m,bp}$. The low-pass filtering may be expressed by the following equation:

$$\{\dot{y}_{lp}, \dot{y}_{m,lp}\} = G_{lp}(s)\{|\dot{y}_{bp}|, |\dot{y}_{m,bp}|\}$$

where $G_{lp}$ designates the transfer function of the low-pass filter, $\dot{y}_{lp}$ is the low-pass filtered version of $\dot{y}_{bp}$, and $\dot{y}_{m,lp}$ is the low-passed filtered version of $\dot{y}_{m,bp}$. The low pass filter is applied so that the input/output phasing does not affect the estimation result of the catalyst's transfer function gain. Method 300 proceeds to 318 after the signals have been low-pass filtered.

At 318, method 300 determines a model error ϵ is determined. The modeling error is determined according to the following equation:

$$\epsilon = \dot{y}_{lp} - k_{scl} \times \dot{y}_{m,lp}$$

where ϵ is the model error and $k_{scl}$ is the catalyst transfer function gain magnitude estimate that is given a starting value (e.g., 1), which the algorithm adjusts as the method iterates after each program loop. Method 300 proceeds to 320 after the catalyst transfer function gain magnitude estimate is determined.

At 320, method 300 determines an updated catalyst transfer function gain magnitude estimate. In particular, method 300 applies an integrator and a calibrated (e.g. adjustable) gain γ to update the catalyst transfer function gain magnitude as indicated in the following equation.

$$\dot{k}_{scl} = \gamma \cdot \epsilon$$

Method 300 proceeds to 321 after the catalyst transfer function gain magnitude has been updated.

At 321, method 300 judges if the estimation has met a maturity metric. In one example, the maturity metric is an amount of time has been exceeded (e.g., ten minutes). In other examples, the maturity metric may be a distance traveled by the vehicle. More sophisticated methods that evaluate engine variables in terms of persistent change are yet another effective way to evaluate maturity. If method 300 judges that the maturity metric has been met, the answer is yes and method 300 proceeds to 322. Otherwise, the answer is no and method 300 returns to 318.

At 322, method 300 judges if the estimated catalyst transfer function gain magnitude is greater than a threshold magnitude. If so, the answer is yes and method 300 proceeds to 326. Otherwise, the answer is no and method 300 proceeds to 324.

At 324, method 300 indicates that the catalyst is a nominal or within specification catalyst. Method 300 may provide no indication of catalyst degradation if the catalyst is determined to be a nominal catalyst. Method 300 proceeds to 328.

At 328, method 300 outputs an estimated catalyst age in response to the estimated catalyst transfer function gain magnitude. In one example, a table or function of empirically determined catalyst age values are indexed using the estimated catalyst transfer function gain magnitude and the catalyst age is output. Additionally, if it is determined that the catalyst is a threshold catalyst, or degraded, method 300 adjusts actuators to attempt to reduce engine emissions in response to the catalyst transfer function gain magnitude. In one example, the engine fuel injectors are adjusted so as to reduce the amplitude of the square wave air-fuel ratio provided to the catalyst being diagnosed for possible degradation. A higher amplitude square wave may be desirable when the catalyst is operating as desired since it may require additional gases to penetrate and refresh catalyst reaction cites near the downstream side of the catalyst because the front reaction cites are operating efficiently. However, if the catalyst is degraded, a square wave of the same amplitude may result in lean or rich breakthrough. Therefore, the square wave amplitude may be reduced via adjusting fuel injector on time. Method 300 proceeds to exit after the catalyst age estimate is output and actuators are adjusted responsive to catalyst age.

At 326, method 300 indicates that the catalyst is a threshold or degraded catalyst. Method 300 may provide an indication of catalyst degradation if the catalyst is determined to be a threshold catalyst. In one example, method 300 provides an indication of degradation via changing an operating state of a light or display panel. Method 300 proceeds to 328 after the catalyst has been identified as a threshold catalyst.

Thus, the method of FIG. 3 provides for a method, comprising: during feedback engine air-fuel ratio control responsive to a downstream of a catalyst exhaust gas sensor: indicating degradation of the catalyst in response to a catalyst transfer function determined only within a specified frequency range based on the exhaust gas sensor output; and adjusting an actuator in response to the indicated degradation. The method includes wherein the catalyst transfer function is further based on a modeled output compared with the exhaust gas sensor output. The method includes wherein the degradation is based on a gain of the catalyst transfer function within the specified frequency range above a threshold. The method also includes wherein the specified example frequency range is from 1 to 2 Hz.

In some examples, the method includes wherein the feedback engine air-fuel control is an outer loop feedback control, the method further comprising during the outer loop feedback control, further performing inner loop feedback engine air-fuel ratio control responsive to an oxygen sensor located upstream of the catalyst, wherein the outer loop includes a superimposed square wave added to the feedback control. The method also includes wherein the specified frequency range bounds a frequency of the superimposed square wave from above and below with an upper and lower frequency limit, respectfully, the lower frequency limit greater than zero. The method includes wherein during the feedback control the engine experiences transient and steady state operating conditions while the catalyst transfer function is determined. The method includes wherein air-fuel ratio control includes adjusting fuel injection pulse width.

The method of FIG. 3 also provides for a method, comprising: perturbing a catalyst via supplying the catalyst exhaust gases resulting from a varying air-fuel ratio supplied to an engine; routing data from an upstream oxygen sensor through a model to provide a model output and data from a downstream oxygen sensor through a high pass filter to provide a tailpipe air-fuel ratio derivative estimate; band-pass filtering the model output to provide a band-passed model output and band-pass filtering the tailpipe air-fuel ratio derivative estimate to provide a band-passed tailpipe air-fuel ratio; estimating a catalyst transfer function gain magnitude from a difference between the band-passed tailpipe air-fuel ratio and the band-passed model output. The method further comprises low pass filtering the band-passed model output and the band-passed tailpipe air-fuel ratio before estimating the catalyst transfer function gain magnitude.

In some examples, the method further comprises determining an error between the low pass filtered band-passed model output and the low pass filtered band-passed tailpipe air-fuel ratio. The method further comprises adjusting an estimate of a catalyst transfer function gain magnitude in response to the error.

Figure 4:
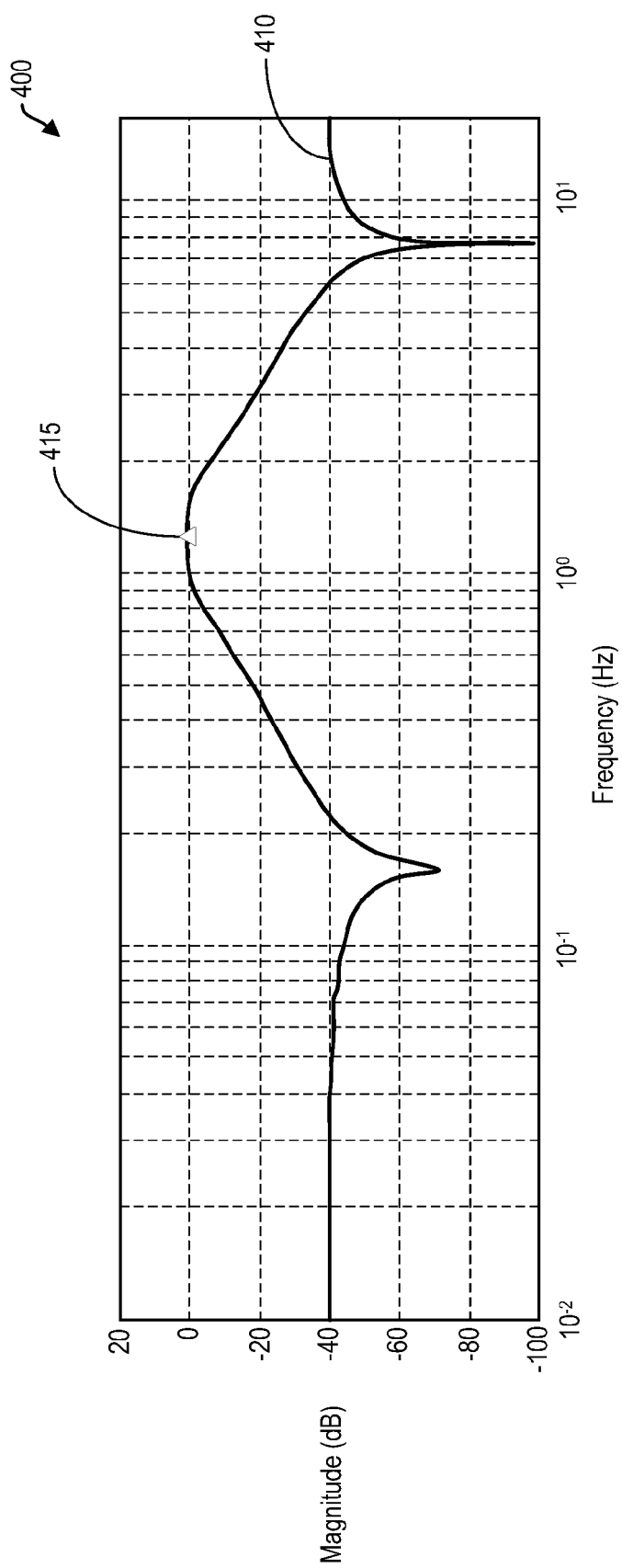
FIG. 4 shows an example plot of magnitude versus frequency for a band-pass filter that is applied to an air-fuel ratio as determined from a downstream HEGO sensor and air-fuel ratio as determined from a catalyst model having upstream UEGO based air-fuel ratio as an input.

Referring now to FIG. 4, a plot of magnitude versus frequency for the band-pass filter applied at 314 is shown. The band-pass filter attenuates or reduces the magnitude of signal frequencies that are not in the pass band of the filter. In this example, the pass band is at 1.5 Hz. The magnitude at 1.5 Hz for the output of the filter is 0 dB, or unfiltered at the pass frequency. Frequencies greater than and less than the pass frequency are attenuated. The width of the pass band is determined by the choices of step 314 in FIG. 3, $t_{cl}$ and $t_{ch}$. Thus, the band-pass filter allows the catalyst transfer function to be determined only within a specified frequency range from the exhaust gas sensor output. By band-pass filtering the exhaust air-fuel ratio, it may be possible to reduce influence from air-fuel variations that are not related to the forcing function (e.g., air-fuel ratio square wave) applied to the catalyst.

Figure 5:
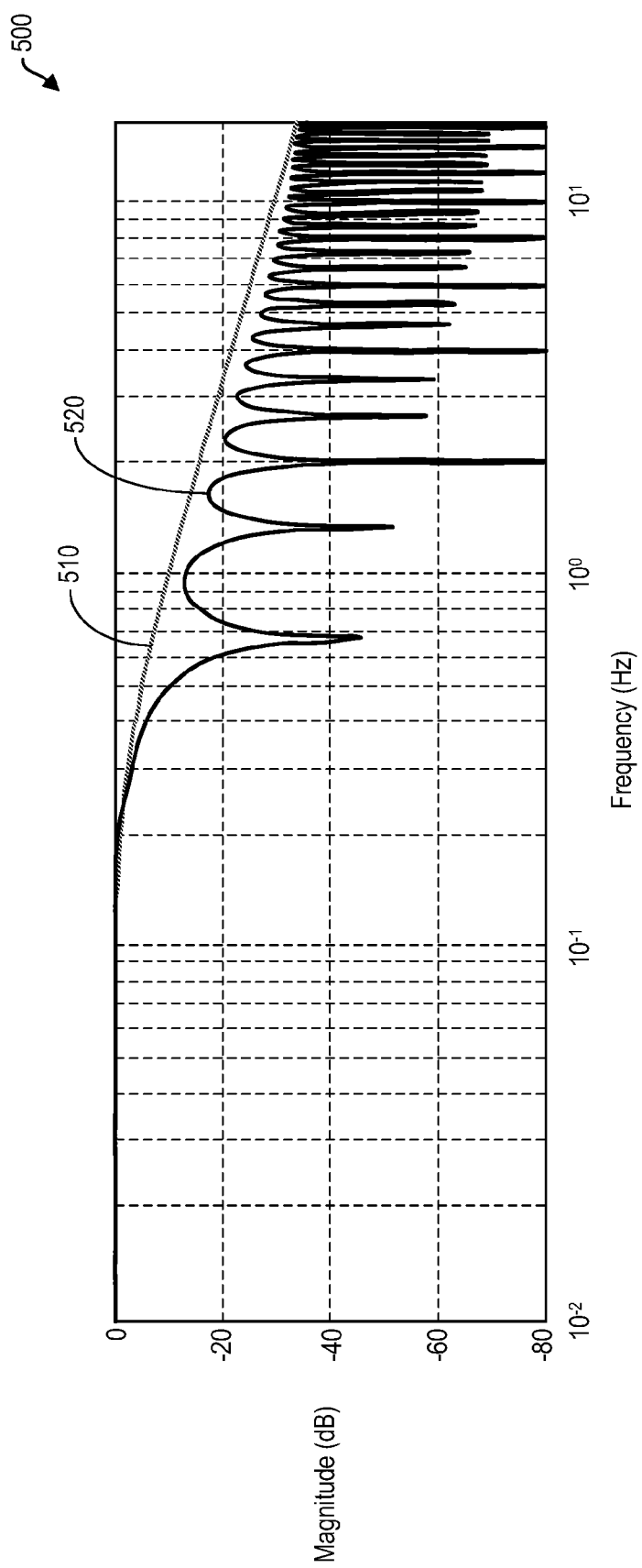
FIG. 5 shows an example plot of magnitude versus frequency for a low-pass filter that is applied to an air-fuel ratio as determined from a downstream HEGO sensor and air-fuel ratio as determined from a catalyst model having upstream UEGO based air-fuel ratio as an input after the air-fuel ratios have been band-pass filtered.

Referring now to FIG. 5, a plot of magnitude versus frequency for the low-pass filter applied at 316 is shown. The low-pass filter attenuates or reduces the magnitude of signal frequencies that are greater than a cut-off frequency of the low band of the filter. In this example, the pass band is less than 1 Hz. Frequencies greater than the upper cut-off frequency are attenuated. By low-pass filtering the band-pass filtered exhaust air-fuel ratio, it may be possible to reduce signal phasing influences on the estimate of the catalyst's transfer function gain magnitude.

Referring now to FIG. 6, a plot of adapted catalyst transfer function scaling factor gains for green, full-useful life, and threshold catalysts is shown. The method of FIG. 3 was conducted seventy six times using the three types of catalysts staring with an initial gain estimate of one. The gains were allowed to update continuously when the outer air-fuel control loop was activated. Labels 602, 610, and 620 represent the mean gain values for the respective green, full-useful life, and threshold catalysts. Likewise, labels 604, 612, and 622 represent the maximum gains for the respective green, full-useful life, and threshold catalysts. Similarly, labels 606, 614, and 624 represent the minimum gains for the respective green, full-useful life, and threshold catalysts. It may be observed that the gains for the threshold catalyst are substantially greater than for the green and useful life catalyst. As such, the gains are a useful way of estimating catalyst age and degradation. Further, the gains for the green and full-useful life catalysts are quite similar.

Referring now to FIG. 7, an example plot of catalyst transfer function adaptation of gains that begin at different initial conditions for a full useful life catalyst is shown. The method of FIG. 3 is applied to a single catalyst with different initial conditions of $k_{scl}$ (from step 320 in FIG. 3) during three separate evaluations. The gain values start out spread widely apart and converge toward each other by time 1200. The gains were each allowed to adapt over a federal test procedure 74 cycle. Although the gains do not converge to the exact same number, they are grouped tightly enough to fall within the range of values shown in FIG. 6 for a full useful life catalyst. Thus, the method of FIG. 3 is shown to be robust for determining catalyst degradation even in the presence of induced error in the system.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
perturbing a catalyst via supplying the catalyst exhaust gases resulting from a varying air-fuel ratio of an engine;
routing data from an upstream oxygen sensor through a model to provide a model output derivative estimate and data from a downstream oxygen sensor through a high pass filter to provide a tailpipe air-fuel ratio derivative estimate;
band-pass filtering the model output to provide a band-passed model output derivative estimate and band-pass filtering the tailpipe air-fuel ratio derivative estimate to provide a band-passed tailpipe air-fuel ratio derivative estimate;
estimating a catalyst transfer function gain magnitude from a difference between the band-passed tailpipe air-fuel ratio derivative estimate and the band-passed model output derivative estimate; and
adjusting engine fuel injectors in response to the estimation of the catalyst transfer function gain magnitude.

2. The method of claim 1, further comprising low pass filtering the band-passed model output derivative estimate and the band-passed tailpipe air-fuel ratio derivative estimate before estimating the catalyst transfer function gain magnitude.

3. The method of claim 2, further comprising determining an error between the low pass filtered band-passed model output derivative estimate and the low pass filtered band-passed tailpipe air-fuel ratio derivative estimate.

4. The method of claim 3, further comprising adjusting an estimate of a catalyst transfer function gain magnitude in response to the error.

5. The method of claim 1, wherein the catalyst is a three-way catalyst.

6. A system, comprising:
an engine including an exhaust system, the exhaust system including a catalyst and oxygen sensors positioned upstream and downstream of the catalyst; and
a controller including instructions stored in non-transitory memory for:
routing data from the upstream oxygen sensor through a model to provide a model output derivative estimate and data from the downstream oxygen sensor through a high pass filter to provide a tailpipe air-fuel ratio derivative estimate;
band-pass filtering the model output to provide a band-passed model output derivative estimate and band-pass filtering the tailpipe air-fuel ratio derivative estimate to provide a band-passed tailpipe air-fuel ratio derivative estimate;
estimating a catalyst transfer function gain magnitude from a difference between the band-passed tailpipe air-fuel ratio derivative estimate and the band-passed model output derivative estimate; and
adjusting engine fuel injectors in response to the estimation of the catalyst transfer function gain magnitude.

7. The system of claim 6, wherein the controller further includes instructions for low pass filtering the band-passed model output derivative estimate and the band-passed tailpipe air-fuel ratio derivative estimate before estimating the catalyst transfer function gain magnitude.

8. The system of claim 7, wherein the controller further includes instructions for determining an error between the low pass filtered band-passed model output derivative estimate and the low pass filtered band-passed tailpipe air-fuel ratio derivative estimate.

9. The system of claim 8, wherein the controller further includes instructions for adjusting an estimate of a catalyst transfer function gain magnitude in response to the error.

10. The system of claim 6, wherein the catalyst is a three-way catalyst.

* * * * *